Figure 1:
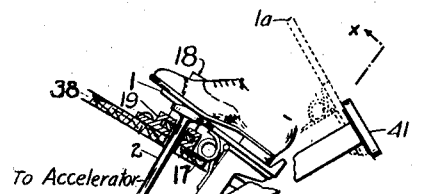
Figure 2:
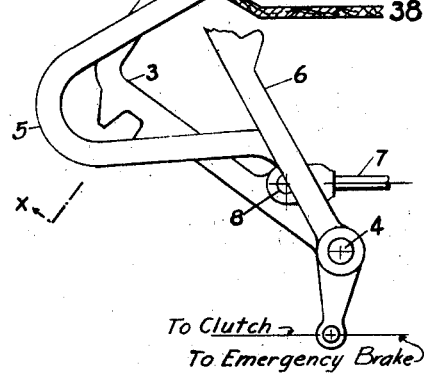
Figure 3:
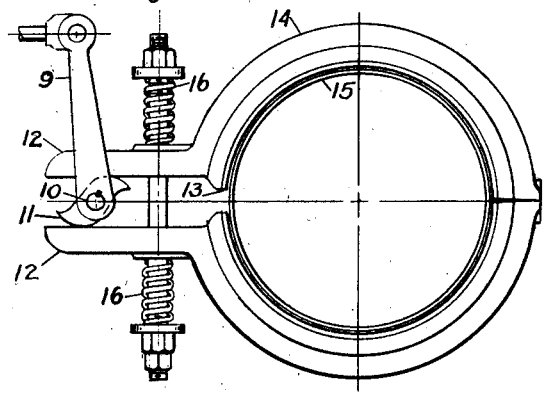

Sept. 24, 1929.　　　S. H. SEIDMAN　　　1,729,015

MOTOR VEHICLE CONTROL

Filed Nov. 12, 1927

Sol H. Seidman, Inventor

Patented Sept. 24, 1929

1,729,015

UNITED STATES PATENT OFFICE

SOL H. SEIDMAN, OF NEW YORK, N. Y.

MOTOR VEHICLE CONTROL

Application filed November 12, 1927. Serial No. 232,823.

My invention relates to improvements in the control of motor vehicles. Some of the principal objects of my improvements are:
1. To provide easier manipulation of the brakes;
2. To provide automatic braking of the vehicle;
3. To provide for automatic release of the clutch when the service brake is fully applied;
4. To provide for positive locking of the brakes and clutch.

I attain these and other objects by the mechanism illustrated in the accompanying drawing, in which—

Fig. I is a schematic representation of a vertical side elevation with parts removed. (38) is the floor board cut along a line immediately in front of the accelerator in its usual position and thru openings in the floor board protrude the various pedals, the service pedal being shown in its applied position.

Fig. II is a side elevation of an automatically applying brake mechanism.

Fig. III is a sectional elevation taken along a plane of line x—x in Fig. I, and viewed as indicated by the arrows at the ends of line x—x, but with no manual force exerted on any of the pedals.

Similar numerals refer to similar parts throughout the several views.

Pedal (1) is the service brake pedal which as shown in Fig. I is placed in line with the accelerator plunger (2), so that in its present applied position it acts as a foot rest for conveniently operating the accelerator. In being applied, pedal (1) moves from its released position (1ª), thereby moving lever (3) to which it is attached. Lever (3) pivots loosely about stub shaft (4) on which are also loosely pivoted the lever (5) actuating the emergency brake, and lever (6) controlling the clutch. As in the usual design of brake mechanisms, link (7) is connected to lever (3) at (8), so that as pedal (1) moves downward, lever (3) turns counter-clockwise so that link (7) is drawn to the left. Arm (9) on one wheel brake (Fig. II) is connected along with similar arms on the other wheel brakes by a system of links and pivoted arms to link (7), whereby leftward motion of link (7) causes a counter-clockwise rotation of arm (9).

Pin (10) and cam (11) keyed to arm (9) rotate with it, forcing the jaws (12) of brake (14) to be pried apart, so that brake band (13) mounted on the inner face of brake (14) is drawn away from drum (15) of the wheel. The springs (16), clamped on the outside of jaws (12) are thereby compressed; so that when the applied force is released from pedal (1), the stored up energy in the compressed springs (16) forces the jaws back, causing cam (11), pin (10) and arm (9) to turn clockwise, link (7) to move right and thus bring pedal (1) back to position (1ª).

The foot is comfortably resting on the pedal (1), the leverage against the springs (16) being adjustable for minimum back pressure on pedal. The fore part of the foot is directly over the accelerator (2) which may then be operated in the usual manner. For throttle opening greater than normal, fore part of pedal (1) is allowed to follow the foot movement against the pressure of a suitable spring (17).

It is sometimes desirable to remove the foot from pedal (1) without thereby applying the brakes. This is accomplished by a latch mechanism better indicated in Fig. III. A U-bar (18) which slides in a slotted base (19), has one end projecting above and immediately to the right of pedal (1) in its brake release position. The other end of the U-bar (18) projects to left of pedal (1) and back of latch (20) which is pivoted at (21) and rests against this end of the U-bar. Lateral movement of the foot to the right against the right projection of the U-bar (18), forces latch (20) to the right and over pedal (1), preventing the pedal from returning to its brake-on position when the foot pressure is removed. Lateral movement of the foot to the left, disengages latch (20), moving bar (18) to left with it.

Pedal (22), pivoted also on shaft (4) applies the emergency brake when manual force is exerted thereon—(as is usual in present service brakes). If latch (20) bears on pedal (1), arm (23), pivoted at (21) and attached to latch (20) by spring (24) will be moved up toward pedal (22). When foot pressure is applied to pedal (22), arm (23) will be forced down, thereby disengaging latch (20), so that the service brake is immediately applied, even before the emergency brake is fully applied. Likewise, in normal operation of the service brake, the foot may not press against pedal (22) to apply the emergency brake until it has left pedal (1) and the service brake had therefore already been applied.

The service brake is thus completely automatic and the emergency brake is manual in operation; the emergency brake being applied only after the service brake is already applied.

Directly under the floor board and attached to the chassis is a metal housing (25), in which, pivoted on pin (42) are cams (26) and (27). Bearing against cam (26) and to left of its pivot (25) is arm (28) which is pivoted at (29). Spring (30) actuates the movement of cam (26) by pressing against arm (28).

As brake lever (3) moves up,—brake applied,—spring (30) forces cam (26) to bear against the under side of lever (3), and projection (31) on cam (26) moves counter-clockwise until it abuts against the corresponding projection (32) on cam (27) causing the latter to revolve counter-clockwise so that its arm bears down on clutch control lever (6) and the clutch to open, in case that had not already been done by driver, so that the motor would not stall.

When service brake is released, lever (3) moves down, forcing clockwise rotation of cam (26) and correspondingly of projection (31), thereby allowing free movement of cam (26) with that of lever (6). Side thrust of cam (26) in this position is taken by fixed bracket (33) along which lever (3) moves.

Thus automatic release of clutch before the full application of the service brake is obtained.

As shown in Fig. III, the service brake is then in applied and clutch in released position—pedal (1) is up and pedal (41) is down. Projection (34) on pivoted arm (35) bears against arm (28) so that pedal (1) cannot be moved down to release the brake and engage the clutch. Arm (35) pivoted at (36) is attached to vertical rod (37) which runs thru floor board (38), and is actuated by lock (39) in locking housing (40), which housing is attached to cam housing (25).

When a key is inserted in lock (39) and turned counter-clockwise, rod (37) is moved up by projection of (39) in slot of rod, causing arm (35) to turn clockwise and projection (34) thereon to move away from (28), thereby enabling the operation of the brakes and clutch.

Of course, it will be understood that various modifications may be made in the construction and arrangement of parts without departing from the spirit of the invention as claimed, and that my claims for control are applicable to various types of brakes and classes of motor vehicles.

I claim:—

1. In a motor vehicle, the combination of a foot pedal, service brakes, means for releasing said service brakes when foot pressure is applied to said pedal, a latch for holding said pedal in place, a bent bar, projections on said bar at each side of pedal, for engaging or disengaging said latch by lateral movement of said foot.

2. In a motor vehicle, the combination of an accelerator, service brake release arm, a pivoted pedal on said arm with spring to keep fore part of said pedal upward, same being in line with said accelerator and acting as foot rest for operating accelerator when said pedal is held in position for brake release.

3. In a motor vehicle, the combination of a service brake, a clutch, means for automatically releasing said clutch at a predetermined point after partial application but before the complete application of said service brake.

4. In a motor vehicle, the combination of a service brake pedal, a service brake, a clutch pedal and clutch operated thereby, means for automatically applying said service brake when said brake pedal is allowed to assume its normal released position, and means for automatically disengaging said clutch at a predetermined point after partial application but before the complete application of said service brake.

5. In a motor vehicle, the combination of an accelerator, a service brake, a service brake pedal in line with said accelerator and in its downward position acting as foot rest when operating said accelerator, means for automatically applying said service brake when force holding it down is removed, a clutch pedal with clutch operated thereby, means for disengaging said clutch at a predetermined point after partial application of said service brake.

6. In a motor vehicle, the combination of a service brake lever, means for automatically applying service brake when force bearing down on lever is removed, a clutch control lever, a brake cam with its arm bearing against under side of said brake lever, a clutch cam with its arm resting on said clutch lever, a suitable spring bearing against a pivoted arm thru which it actuates said brake cam to follow said brake lever and at predetermined position to engage said clutch cam to bear down on clutch lever, said lever thereby disengaging clutch after service brake has been partially applied.

7. In a motor vehicle, the combination of a service brake and pedal therefor, an emergency brake and pedal therefor, said pedals arranged to be operated by the same foot, means for automatically applying said service brake when no force is exerted on pedal therefor, and means for applying emergency brake by exerting pressure on pedal therefor, whereby said emergency brake would be applied only after said service brake.

8. In a motor vehicle, the combination of an accelerator and service brake, pedal therefor in line with said accelerator and acting as foot rest for operating it when said pedal is in brake release position, means for automatically applying said service brake when no force is exerted on said brake pedal, an emergency brake and pedal therefor arranged to be operated by the same foot as operates said service brake pedal, said emergency brake being normally applied by foot pressure on said emergency brake pedal, so that said motor vehicle cannot be accelerated when either service or emergency brake is in the applied position.

9. In a motor vehicle, the combination of a service brake, and pedal therefor, means for automatically applying said service brake when no force is exerted on said pedal, means for preventing said automatic application when so desired, an emergency brake and pedal therefor, and means, when pressure is exerted on said emergency brake pedal to apply said emergency brake, for releasing said second means, thereby causing said first means to apply said service brake before the complete application of said emergency brake.

10. In a motor vehicle, the combination of an accelerator, a service brake pedal in line therewith and acting as foot rest when in brake release position for operating said accelerator, a latch for holding said pedal in its brake release position, a U-bar, projections on said bar on each side of pedal for engaging or disengaging said latch from said pedal, by lateral movement of the foot, an arm connected to said latch by suitable spring, said arm extending under an emergency brake pedal whereby pressure on said emergency brake pedal for applying emergency brake while latch is holding said service brake pedal will cause said extending arm to move down, thereby disengaging said latch from said service brake pedal, and means for applying service brake when said service brake pedal is free from all force thereon.

11. In a motor vehicle, the combination of a service break and pedal therefor, a clutch and pedal therefor, means for automatically releasing said clutch at predetermined position after application of said service brake and means for locking said service brake in the applied and clutch in the released position.

12. In a motor vehicle, the combination of a service break and lever therefor, means for automatically applying said service brake when force bearing down on lever is removed, a brake cam with arm bearing against under side of said brake lever, a clutch cam with arm resting on a clutch lever, a suitable spring bearing against pivoted arm thru which it actuates said brake cam to follow brake lever, and, at a predetermined position to engage said clutch cam to bear down on clutch lever, said lever thereby disengaging clutch after service brake had been partially applied; a locking arm connected at one end to a vertical rod, a lock on said rod, motion of said rod downward causing said locking arm to bear on said pivoted arm, thus locking said cams and thereby also said service brake in applied, and clutch in released position, and conversely, upward motion of said rod, releasing cams.

13. In a motor vehicle, the combination of an accelerator, the service brake pedal in line with said accelerator and arranged to act as foot rest when in brake release position, a service brake, an emergency brake, and pedal therefor, arranged to be normally operated by the same foot after it is removed from service brake pedal, a clutch and pedal therefor, means for applying said service brake when said service brake pedal is relieved of any pressure, means for releasing said clutch when said service brake is applied, and means for locking said service brake pedal in its brake applied position and said clutch in its disengaged position.

14. In a motor vehicle, the combination of a drum on a wheel, a brake band externally on said drum, means for keeping said brake band applied to said drum, and, when actuated by manual force on a pedal mechanically linked thereto, means for withdrawing said brake band from pressing on said drum.

15. In a motor vehicle, the combination of a drum on a wheel, a brake band set externally around said drum and fastened to a brake having a pair of jaws thereon, a rod threaded at each end passing through said jaws of said brake, a spring mounted at each end of said rod and clamped to jaws by means of nuts on said rods, pressure against said jaws being varied by screwing up said nuts, a cam set between said jaws and bearing on the inner face of each jaw, a pedal mechanically linked to said cam so that pressure on said pedal causes rotary movement of cam, thereby opening said jaws of brake against the pressure of said springs; and, when said pressure on said pedal is removed, said springs to force cam to rotate in opposite directions, thereby moving said pedal back to normal brake applied position.

16. In a motor vehicle, the combination of a power supply control, a service brake, a pedal therefor in line with said power supply control, but in no way connected thereto, means for releasing said service brake when said pedal is depressed, and conversely, for automatically applying said brake when depressing force is removed, and means for preventing said automatic application of brake when so desired.

17. In a motor vehicle control, the combination of a service brake, a pedal therefor placed close to the power supply control so that in its downward position said pedal acts as a foot rest for said power supply control, and means for releasing said service brake when said pedal is depressed and for automatically applying said brake when said depressing force is removed.

SOL H. SEIDMAN.